United States Patent [19]
Broker et al.

[11] 3,896,205
[45] July 22, 1975

[54] METHOD FOR MAKING TUBULAR FLUIDIC RESISTORS

[75] Inventors: David C. Broker; Judith L. Wisniewski, both of Milwaukee, Wis.

[73] Assignee: Johnson Service Company, Milwaukee, Wis.

[22] Filed: June 1, 1970

[21] Appl. No.: 41,814

[52] U.S. Cl. .............. 264/251; 264/275; 264/278; 264/334
[51] Int. Cl. .............................................. B28d 3/00
[58] Field of Search ............ 264/334, 251, 275, 278

[56] References Cited
UNITED STATES PATENTS

| | | | |
|---|---|---|---|
| 2,197,465 | 4/1940 | Brunetti | 264/275 X |
| 2,465,656 | 3/1949 | Morin | 264/251 |
| 2,562,932 | 8/1951 | Meyer | 264/251 X |
| 2,669,770 | 2/1954 | Brewer | 264/251 X |
| 2,781,549 | 2/1957 | Milne | 264/275 X |
| 3,226,463 | 12/1965 | Wallace | 264/272 |
| 3,329,588 | 7/1967 | Mears | 264/334 X |
| 3,381,736 | 5/1968 | Ford et al. | 264/275 X |
| 3,465,432 | 9/1969 | Crimmins | 264/334 X |
| 3,581,364 | 6/1971 | Wyse | 264/278 X |

FOREIGN PATENTS OR APPLICATIONS

| | | | |
|---|---|---|---|
| 745,701 | 11/1966 | Canada | 264/263 |

Primary Examiner—Robert F. White
Assistant Examiner—Thomas P. Pavelko
Attorney, Agent, or Firm—Andrus, Sceales, Starke & Sawall

[57] ABSTRACT

A capillary linear fluidic resistor is formed by molding a plastic about a close tolerance wire to define a particular length-to-diameter ratio. The wire is shaped to the desired capillary passageway and supported in a mold with walls of the mold engaging the wire at the opposite ends of the capillary passageway. Thus, the wire is a close tolerance member having a given constant diameter. A thermoplastic fills the mold to form spaced beads thereon and after curing, the molded member with the wire therein is removed. The close tolerance wire with the spaced beads molded thereon is placed in a second mold with the wall of the mold engaging the beads. A thermoplastic which does not adhere to either the thermoplastic of the beads or the wire is then injected about the wire to form the body of the fluidic resistor. After curing, the bead, wire, and thermoplastic body are removed from the mold and the wire is pulled from the plastic member to form the capillary resistor.

4 Claims, 10 Drawing Figures

PATENTED JUL 22 1975 3,896,205

INVENTOR.
David C. Broker
Judith L. Wisniewski
BY
Andrus, Sceales, Starke & Sawall
Attorneys

METHOD FOR MAKING TUBULAR FLUIDIC RESISTORS

BACKGROUND OF THE INVENTION

This invention relates to a tubular fluidic resistor and method of making such a fluidic resistor and, in particular, to a novel method of molding a linear fluidic capillary resistor to establish a predetermined length-to-diameter ratio.

Fluidic devices employing a suitable fluid, such as air, have been developed in recent years to perform functions analogous to active electronic devices. A particularly satisfactory fluidic device is shown in U.S. Pat. No. 3,151,215 which issued to Bjornsen et al and, in particular, discloses a fluidic device for performing amplification, switching and the like. Additionally, fluid beam deflection devices, with or without lock-on wall constructions, have been developed to provide for fluid switching, amplifying and the like in pure fluid or fluidic systems. These various devices provide functions closely analogous to electronic amplifying devices such as vacuum tubes, transistors and the like. Fluid systems as electronic systems, however, require interconnecting passive elements including resistors. Fluid restrictors, orifices, valves and other similar components have, of course, been employed for many years in pneumatic and other liquid control and operating systems. Such devices, however, often have certain disadvantages when applied to the design of a fluidic system. Thus, the usual resistance type devices are highly flow-dependent and generally are not linear. In many fluidic controls as in electronic controls, a linear resistor is required in order to permit prediction of the circuit operation and proper circuit design.

Generally, the pressure versus flow characteristic of fluid resistance elements for laminar flow may be classified for design consideration in accordance with the equation $Q = C(\Delta P)N$; wherein Q is equal to flow, C is equal to a proportionality constant, $\Delta P$ is equal to the pressure drop through the element and N is an exponent which varies in accordance with the particular characteristic. If N is significantly less than or great than 1, the resistance is non-linear and the element is correspondingly classified a restrictor. Generally, anything less than 0.8 or greater than 1.3, defines a restrictor. Conversely, a fluid resistance element having an N exponent within the above range has an essentially linear pressure versus flow characteristic and is defined as a linear resistance element or a resistor. Further, the elements within this range comprise one or more capillary passageways or channels which are connected in parallel to develop laminar flow. The capillary channels will normally have a cross section which is round, square or rectangular. The present invention is particularly directed to the capillary type resistance elements.

The various fluid resistances have been made in many different ways. Thus, orifices and other restrictors of a non-linear variety have been made from metals, thermoplastics, ceramics, and the like. Orifices and the like may be readily machined, diecast, stamped or punched as well as sintered from powdered metal and molded from thermoplastics, ceramics and the like. The larger valued restrictors are normally formed by interconnecting two separate components over a capillary channel or by suitably modifying a metallic or plastic tube.

Although such methods have been satisfactorily applied to non-linear fluid elements, such as orifices and restrictors, they have not been satisfactorily applied to capillary tubes which have been commercially formed from metal or glass tubing of a predetermined length or by crimping of the metal. Commercial metal tubing of larger than hypodermic needle size diameter may also be crimped or deformed perpendicular to its flow access to create an approximately rectangular capillary channel which will produce a desired linear resistance.

However, even within given ranges of flow and pressures, only one particular length for a given diameter produces a linear resistance with flow. The theory and explanation of this phenomena is fully set forth in a paper entitled "Fluidic Resistors" by p. H. Sorenson and N. T. Schmitz which was published in the "Fluidics Quarterly", Volume 1, No. 3, in April, 1968. As more fully disclosed therein, the diameter-to-length ratio can be determined to maintain a linear resistance for a given temperature, downstream pressure and pressure differential.

However, applicants have found that the usual method of providing the linear restrictors, such as by cutting of a metal or glass tubing to the desired length, does not reliably maintain a predicted operation. Small diameter passageways are encountered and required in fluidic devices. The linear fluidic resistors may be of the order of 0.003 inch diameter with a length on the order of one-half to two inches. When small capillaries, such as those employed in fluidic devices are so constructed, applicants have found that the severing of the ends, whether metal or plastic, normally results in some slight distortion and possibly even complete closure, which destroys the linearity of the device. Further, when the tubing is cut to the desired length, it is difficult to provide the necessary connectors without affecting the characteristic.

Further, as noted above, linearity of the resistance is dependent on maintaining a length-to-diameter ratio. It is important, therefore, that the length and the diameter be accurately established. Space requirements and the like may dictate use of a curved capillary. The metal and glass tubing are difficult to so form. Although an extruded plastic tube can more readily be cut and formed, certain practical difficulties have been discovered. In designs requiring capillaries, the formation of given length of the curved tube, without destroying the ratio, was difficult. Generally, however, maintaining the internal diameter at a constant presented even more severe problems because the usual plastic extrusion method of forming tubing and the like requires rather broad tolerances. The normal manufacturing tolerances result in a substantial variation of the resistance of the member for a given length. Further, even plastic tubing, when cut, may deform and introduce non-linearity into the flow characteristic.

SUMMARY OF PRESENT INVENTION

The present invention is particularly directed to a practical and reliable method of forming an improved linear capillary resistor wherein a plurality of similar devices can be produced with a repeatable and predictable characteristic. The invention permits various configurations of the capillary passageway and provides a convenient means for integrally interconnecting and forming the desired connecting means.

Generally, in accordance with the present invention, a capillary linear resistor is formed by molding of a suitable plastic body material about a close-tolerance wire-like rod which is supported within a suitable mold. The rod is formed and supported in the configuration of the desired capillary passageways with the mold walls engaging the rod at the ends of the passageway. After the casting and curing of the material, the rod and body portion are removed from the mold. The wire-like rod is formed of a suitable metal, plastic or of like material which is non-adhering with respect to the material of the cast body. The rod is formed of a closetolerance member having a given constant diameter. The rod is removed by pulling of the rod outwardly through one end of the body.

The rod may remain in the fluidic resistor, creating the capillary channel, until such time as the fluidic resistor is to be connected into the fluidic circuit. This will insure that the channel is unobstructed or "clean" at the time of the connection into the circuit.

In accordance with a preferred construction of the present invention, the capillary body member is formed with the connectors integrally molded therewith. Particularly as applied to a curved capillary configuration, the wire is cut to a given length somewhat in excess of the required length of the capillary passageway. The ends of the wire are encapsulated with suitable beads up to the spaced points which precisely correspond to the length of the capillary. The shape of the end beads is preferably provided with an outer exterior conforming to the internal configuration of the desired connecting members for the resistor. The bead is preferably formed by placing the cut wire into a mold having aligned space cavities spaced in accordance with the length of the capillary passageway, and is of a suitable material having a minimal adherence to the wire-like member or to the material from which the body of the capillary is to be formed. If the rod is formed of a metal wire, a magnet may also be employed to properly locate the ends within the beading mold. If the rod is of some other material, a static charge can be conveniently utilized. After the molding of the beads, the wire is removed and shaped in accordance with the capillary passageway. The formed member is inserted in the resistor mold with the beads located in clamping openings to properly support the rod within the resistor mold. The resistor mold is charged with the suitable plastic and cured to a solid state. The completed unit is then removed with the beads projecting outwardly from the integrally formed connectors. The connectors may be formed with suitable radial recesses or projections to provide the conventional jack-type connection.

After the unit has been thus formed and when it is to be applied into a circuit, a clamping force is applied to one of the beads and the rod is extracted from the opposite bead and the resistor body by applying a pulling force. The opposite bead is then removed from the plastic body and the capillary linear resistor is thus formed with the integral connectors for direct connection into the desired circuit. The several elements can be separately formed as described employing the separate beaded wires or a continuous process can be provided for applying suitably spaced and appropriately shaped beads to spaced points on a continuous length of wire with the elements subsequently separated and applied to the resistor molding apparatus.

Further methods may be employed within the concept of the present invention. For example, a precut wire may have the opposite ends thereof inserted into an orifice and a chamber which would be inserted into a resistor mold. As in the beaded method, the orifice and chamber would be spaced to establish the length of the exposed wire within the resistor mold and thereby accurately determine the length of the molded capillary channel. The orifices can, of course, be part of a mold insert or the like and be continuously reusable.

BRIEF DESCRIPTION OF DRAWINGS

The drawing furnished herewith illustrates the best mode presently contemplated by the inventor for carrying out the subject invention in which the above advantages and features are clearly disclosed as well as others which will be readily understood from the following description of the embodiments shown.

In the drawings.

DESCRIPTION OF ILLUSTRATED EMBODIMENTS

Figure 1:
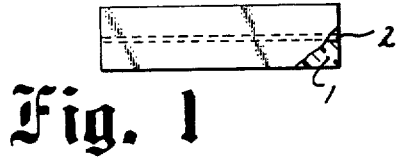
FIG. 1 is a side elevational view of a simple, straight capillary resistor.
Figure 2:
FIG. 2 is an end view of the resistor shown in FIG. 1.
Figure 3:
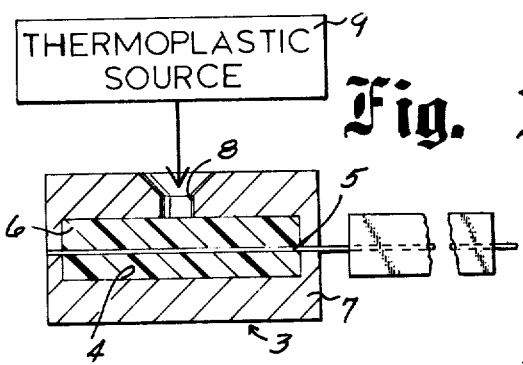
FIG. 3 is a vertical section through a mold structure for forming a series of capillary resistors such as shown in FIGS. 1 and 2.
Figure 7:
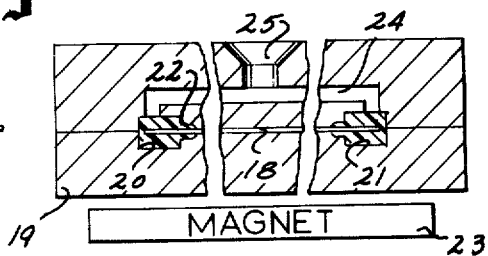
FIG. 7 is a vertical section through a mold apparatus showing an intermediate molding step for a capillary passageway forming wire.

Referring to the drawings and particularly to FIGS. 1 and 2, a relatively simple, straight capillary resistor is shown including an elongated plastic body 1 having a central straight or rectilinear capillary opening 2. In accordance with the present invention, the capillary resistor may be constructed in accordance with the teaching of FIG. 3. As shown in FIG. 3, a split mold 3 is provided having an inner cavity 4 corresponding to the outer configuration of the capillary resistor and, in particular, the plastic body 1. In particular, the longitudinal length of the cavity 4 precisely corresponds to the length of the capillary resistor body 1. A wire or rod 5 extends longitudinally through the cavity 4 and outwardly, at least partially, through the opposite end walls 6 and 7 of the cavity 4. The mold 3 is split along the axis of rod 5 and provided with an injection molding opening 8 interconnected to a suitable material injection source 9 which is adapted to completely fill the mold cavity 4 with a suitable plastic or the like to form body 1. The invention has been particularly applied using a thermoplastic and is so described for purposes of disclosure.

After the cooling of the thermoplastic, the molded capillary is removed from the mold 3 and the rod 5 removed by pulling longitudinally outwardly. The length of the mold cavity 4 accurately determines the length of the capillary passageway 2 and therefore of the resistor. The rod 5 is a close tolerance member and thus establishes an essentially constant diameter capillary passageway. Further, by employing a close-tolerance rod, the several capillary resistors formed with the apparatus of FIG. 3, have essentially the same characteristics. Further, as a result of the close tolerances and repeatability of the length-to-diameter ratio, the characteristic of each resistor can be accurately predicted.

In FIG. 3, the rod 5 is shown extending longitudinally through the mold cavity 4 and with the opposite ends clamped in position by the opposite end portions of the mold. This permits essentially continuous production of a series of the capillary resistors spaced from each other, with the wire or rod extending outwardly from the opposite ends of the plastic body portion. Obviously, if so desired, the wires can be precut to any desired length and the body 1 separately molded about each of the individual rods.

The rod 5 can, or course, be removed from the plastic body 1 at any desired time. However, the rod may advantageously be maintained within the plastic body 1 and removed only at the time of the connection of the capillary resistor into a fluidic circuit. This will insure that the capillary passageway is essentially completely free of any foreign matter at the time of connection.

Figure 4:
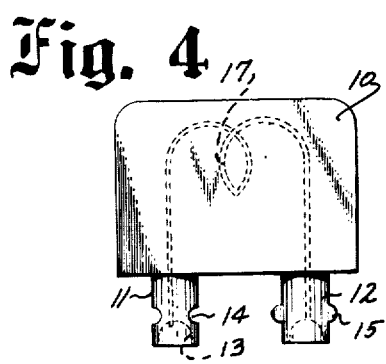
FIG. 4 is an elevational view of a relatively complicated linear resistor having a capillary passageway including a looped portion and integral end connectors.
Figure 5:
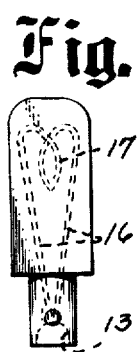
FIG. 5 is a side elevational view of the capillary shown in FIG. 4.
Figure 6:
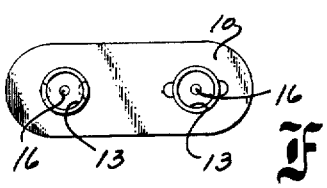
FIG. 6 is an end view of the capillary shown in FIGS. 4 and 5.

The capillary passageway, in accordance with the present invention, can very conveniently be formed in other than a straight passageway and also may be formed with integral circuit connectors, for example, as shown in FIGS. 4 through 6, inclusive.

Referring particularly to FIG. 4, the capillary includes a generally rectangular plastic body 10 and a pair of protruding snap-on connectors 11 and 12 projecting outwardly in parallel spaced relation from one end wall of the body 10. The outer ends of the snap-on connectors 11 and 12 are provided with recesses or depressions 13 to receive an incoming conduit, not shown, and the outer surfaces are provided with suitable lock-on recesses and projections 14 and 15, respectively, to support the interconnection. A capillary passageway 16 extends inwardly from the recess 13 of connectors 11 and 12 to a common complete loop 17 within the plastic body 10.

The capillary resistor of FIGS. 4 through 6 is preferably constructed in accordance with the teaching of the present invention, as shown in FIGS. 7 through 10 and described as follows.

A wire or rod 18 of a length somewhat in excess of the length of the capillary passageway is provided. The wire 18 is clamped within a mold 19 having a pair of similarly shaped spaced cavities 20 and 21 with the cavities spaced from each other in accordance with the precise total length of the capillary passageway 16. The wire 18 is clamped within the mold with the opposite ends thereof located and extending through or at least into the cavities 20 and 21. In the illustrated embodiment of the invention, the end cavities 20 and 21 are similarly constructed with the adjacent spaced portions stepped to define a reduced diameter portion 22 corresponding in diameter and configuration to the recesses 13. If wire 18 is a metal member, a magnet 23 is preferably provided to bias and locate the opposite end of the wire 18 generally centrally within the mold cavities 20 and 21. If the wire 18 is formed of some other material, it may conveniently be properly located through the use of a static charge source or the like.

The mold 19 is provided with an injection molding passageway 24 which connects with a suitable input opening 25 and with the spaced end cavities 20–21. A suitable injection molding material source, not shown, is connected to opening 25 to fill the cavities 20 and 21. For example, it may be a suitable thermoplastic, glass, ceramic, metal or plaster. The particular material employed will depend upon the material from which the capillary resistor 10 is made and the configuration will, of course, conform to the desired configuration of the end connectors.

Figure 8:
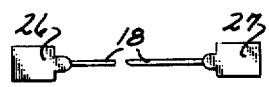
FIG. 8 is an elevational view of the capillary wire formed from the structure of FIG. 7.
Figure 9:
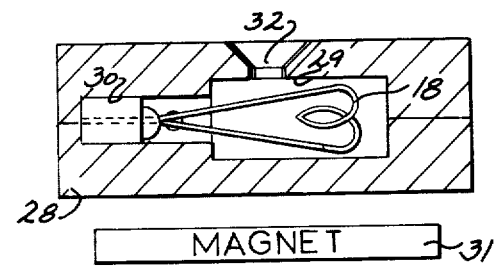
FIG. 9 is a vertical section showing the positioning of the capillary wire of FIG. 8 in a mold for forming of the resistor of FIG. 4.
Figure 10:
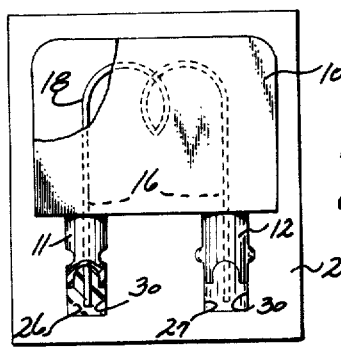
FIG. 10 is a view showing the molded capillary resistor of FIG. 4 with the wire forming unit of FIG. 8 connected within and to the resistor.

After the curing of the molded material, the unit is removed from the mold to form an elongated rod having the cast end beads 26 and 27, as shown in FIG. 8. This member thus has an exposed rod length corresponding precisely to the total length of the capillary passageway 16, including the loop 17. The wire unit of FIG. 8 is formed to the shape of passageway 16 and is disposed within a mold 28 such as shown in FIGS. 9 and 10. Thus, the mold 28 has a cavity 29 corresponding essentially to the outer configuration of the capillary resistor 10, including connectors 11 and 12, as shown in FIGS. 4 through 6. The mold cavity 29 further includes extensions from the connector forming positions defining clamping recesses 30 to accommodate and receive the outer end portions of the beads 26 and 27. Thus, the pre-formed element of FIG. 8 is provided with a loop corresponding to the passageway loop 17 shown in FIGS. 4 through 6 and the beads 26 and 27 are disposed in the clamping recesses 30 of the cavity 29 with the recessforming portions projecting into the corresponding connectorforming cavities of the mold. The beads thus hold the forming rod 18 in the proper position within the cavity 28. A magnet 31, or other suitable means, may also be employed to support the thin rod 17, as described with respect to FIG. 7.

The cavity 29 is provided with a mold injection opening 32 which, in turn, is connected to a suitable source, not shown, of a material, such as a thermoplastic. After the thermoplastic material has cured, the molded unit is removed from the mold 28. The wire or rod 17 is readily removed from the passageway by applying a suitable clamping and pulling force to one bead, 26 or 27. For example, if bead 26 is grasped, the opposite bead 27 will abut the cast connector 12 and prevent movement thereof and the wire 17 will thus be pulled outwardly from the opposite bead 27, through the passageway 16 to define the capillary resistor, as shown in FIGS. 4 through 6, inclusive.

Although an individual element similar to FIG. 8 would be formed with the mold structure as shown, a continuous wire system similar to that shown in FIG. 3 could be applied to the bead molding system to provide a plurality of properly spaced beads on a continuous length of wire. The wire would then be severed to separate between the related pairs of beads formed and used to mold the desired resistor.

Applicant has found that the method of the present invention results in a relatively inexpensive resistor which can be readily mass-produced. The present invention permits wide flexibility in the shape of the resistance passageways from straight line to any curved, looped or angularly related configuration and thus permits proper location of the discharge passageways. Further, for any given mold design, the several resistors produced will have essentially identical characteristics. The length and diameter of the wire can be readily and accurately varied to predictably produce different length-to-diameter ratios and thereby provide different characteristics for different units.

Various modes of carrying out the invention are contemplated as being within the scope of the following claims particularly pointing out and distinctly claiming the subject matter which is regarded as the invention.

We claim:

1. A method of forming a linear fluidic capillary member defining a capillary passageway having a predetermined and accurate length and diameter for insertion of an accurate linear flow resistance in a fluidic circuit, comprising forming of a cavity mold having a cavity wall with a pair of spaced locations corresponding to the opposite ends of the capillary passageway, forming a rod member as a rectilinear member having a length in excess of the length of said capillary passageway, releasably attaching bead members spaced in accordance with the length of said capillary passageways, inserting said rod member with said beam members within the mold cavity with the rod shaped in accordance with said capillary passageway, and with the rod member engaging the cavity wall at said pair of spaced locations in accordance with the opposite ends of the capillary passageway, filling the mold cavity with a molding material to enclose the rod member except at said cavity walls, said rod member and said molding material being selected of non-adhering mediums and said rod member having a rigid and smooth outer peripheral surface, pulling one end of said rod member and thereby removing said rod member to directly define a capillary passageway, and removing said bead members from the molded member to expose the ends of said passageways.

2. The method of forming a linear fluidic capillary member in accordance with claim 1, wherein the attaching of said bead members includes the step of mounting the rod member within a mold having bead cavities spaced in accordance with the length of said capillary passageway, and molding said bead members by filling said cavities with a mold material.

3. The method of claim 1, wherein said bead members have an outer configuration corresponding to the interior configuration of a connecting wall portion at the end of the capillary passageway, supporting said rod member within said mold cavity by a clamping recess means gripping the outer portions of the bead members.

4. The method of claim 1, including the step of forming said bead members on the ends of the rod member with an outer configuration corresponding to the interior configuration of a connecting wall portion at the end of the capillary passageway, said mold cavity including a connector wall portion aligned with the bead members.

* * * * *

UNITED STATES PATENT AND TRADEMARK OFFICE
CERTIFICATE OF CORRECTION

PATENT NO. : 3,896,205
DATED : July 22, 1975
INVENTOR(S) : DAVID C. BROKER AND JUDITH L. WISNIEWSKI It is certified that error appears in the above-identified patent and that said Letters Patent are hereby corrected as shown below:

Column 1, Line 38, cancel "$Q=C(\Delta P)N$" and insert --- $Q=C(\Delta P)^N$ ---;

Column 7, Line 24, cancel "beam" and insert --- bead ---;
Claim 1

Column 8, Line 6, before "capillary" cancel "a" and insert --- said ---
Claim 1

Signed and Sealed this

*second* Day of *December 1975*

[SEAL]

Attest:

RUTH C. MASON
*Attesting Officer*

C. MARSHALL DANN
*Commissioner of Patents and Trademarks*